(No Model.)
A. LINDGREN.
SEED DROPPING MECHANISM.
No. 577,047.　　　　　　　　　Patented Feb. 16, 1897.
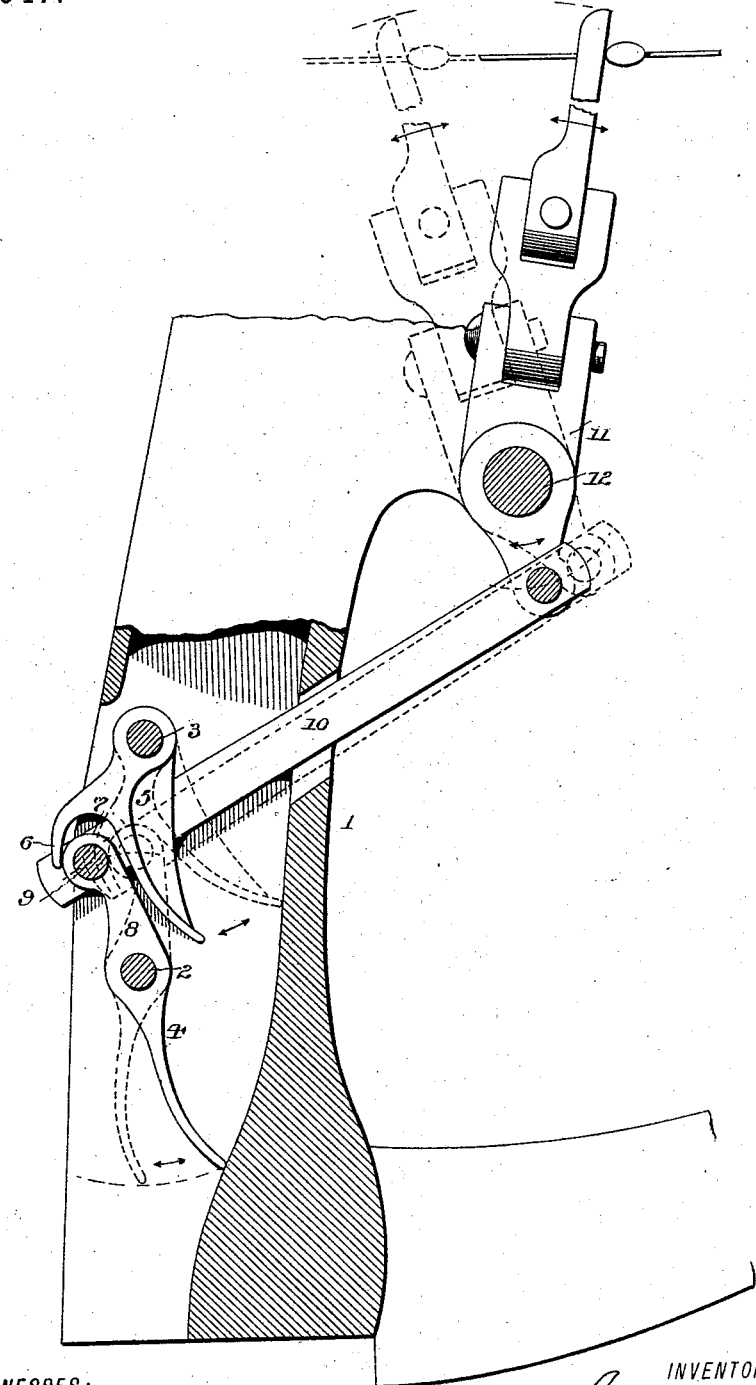
WITNESSES:
Arthur Ashley
D. S. Elmore
INVENTOR
August Lindgren
BY
P. T. Dodge
ATTORNEY.

UNITED STATES PATENT OFFICE.

AUGUST LINDGREN, OF MOLINE, ILLINOIS, ASSIGNOR TO THE MOLINE PLOW COMPANY, OF ILLINOIS.

SEED-DROPPING MECHANISM.

SPECIFICATION forming part of Letters Patent No. 577,047, dated February 16, 1897.

Application filed October 29, 1896. Serial No. 610,452. (No model.)

*To all whom it may concern:*

Be it known that I, AUGUST LINDGREN, of Moline, county of Rock Island, and State of Illinois, have invented a new and useful Improvement in Seed-Dropping Mechanisms, of which the following is a specification.

This invention has reference to a seed-dropping mechanism for seeding-machines and is applicable more particularly to corn-planting machines, although it may be used where it is desired to deposit the seed at intervals, as in hills.

The invention consists in combining with the runner-boot of a corn-planting machine two valves operatively connected together in such manner that when one of the valves is moved to close the seed-discharge opening in the boot the other valve will be moved in the opposite direction to open said opening.

The invention also consists in the details of construction and combination of parts hereinafter described and claimed.

The drawing represents a sectional elevation of the lower portion of the runner-boot of a corn-planting machine having my invention embodied therein.

1 represents the runner-boot, provided, as usual, with the vertical seed-discharge opening, through which the seed is delivered from the usual hopper (not shown) as the machine advances. The discharge-opening is closed at its side and front and open at its rear near the lower end of the boot, and between the side walls of the opening I pivot on horizontal axes 2 and 3, one above the other, a lower valve 4 and an upper valve 5, adapted when moved forward on their axes to close against the front wall and when moved rearward to open the discharge-opening to permit the seed to fall to the ground. The upper valve 5 has formed on its rear side a depending hook or finger 6, forming a groove or socket which loosely embraces the upper rounded edge 7 of an extension 8 on the lower valve. As a result of this arrangement if the upper edge of the lower valve is moved forward it will by its engagement with the upper valve turn the same on its axis and close its lower edge against the front wall of the seed-opening, the lower edge of the lower valve at the same time moving in the opposite direction free of the front wall of the opening. It is seen, therefore, that the two valves may be operated to alternately open and close the discharge-opening in the boot, one of the valves extending in a horizontal position forward against the front wall of the boot and closing the opening, while the other one extends vertically free of the front wall of the boot. In order that these valves may be operated at intervals, I form a bearing in the upper rounded edge of the lower valve, in which is loosely mounted a journal 9. This journal is extended at one end and connected to the rear end of a link 10, which extends forward and upward and has its front end pivoted to the lower end of a check-fork 11, mounted, as usual, on a horizontal rock-shaft 12. The parts normally occupy the position shown in full lines, the fork being held by the usual spring with its upper end inclined forward, in which position the upper valve will be open and the lower valve closed. On the advance of the machine the seed is delivered through the discharge-opening and received by the lower valve. When the fork encounters a knot in the check-line, the fork will be moved rearward to the position shown by dotted lines, thereby moving the upper edge of the lower valve forward and causing the upper valve to close the opening and moving the lower edge of the lower valve rearward to discharge the seed held by it to the ground. When the knot disengages the fork, the latter is automatically thrown to its former position, which action will open the upper valve and close the lower valve, the latter receiving the seed which was delivered to the upper valve when it was closed. The parts remain in this position with the lower valve closed and receiving the seed from the hoppers until another knot in the wire is reached, when the operation just described will be repeated and another hill planted.

It is to be observed that both of the valves are arranged to close against the front wall of the discharge-opening, and, further, that the seed is delivered at the front of the discharge-opening and onto the front faces of the valves, the latter being curved or dished and arranged at a downward inclination, so that there will be no obstruction whatever to the discharge of the seed from one valve to the other and from the latter to the ground.

Having thus described my invention, what I claim is—

1. The combination in a seeding-machine provided with a seed-discharge opening, of an upper valve mounted at its upper edge in said opening on a horizontal axis and having its lower edge arranged to close against the front wall of the opening, a lower valve mounted between its ends on a horizontal axis, its lower edge adapted to close against the front wall of the opening and its upper edge operatively connected with the upper valve and operating devices connected to the upper edge of the lower valve.

2. The combination in a seeding-machine provided with a discharge-opening of an upper valve mounted at its upper edge in said opening on a horizontal axis and formed in its rear face with a groove or socket, a lower valve mounted between its ends in said opening on a horizontal axis and having its upper edge rounded and seated loosely in the socket in the upper valve and operating devices connected to the upper edge of the lower valve.

In testimony whereof I hereunto set my hand, this 24th day of October, 1896, in the presence of two attesting witnesses.

AUGUST LINDGREN.

Witnesses:
F. G. ALLEN,
A. W. WAY.